July 19, 1949.  W. K. ERGEN  2,476,849

DISCRIMINATOR CIRCUIT

Original Filed Aug. 30, 1943

Inventor
WILLIAM K. ERGEN

By
George H. Fisher
Attorney

Patented July 19, 1949

2,476,849

UNITED STATES PATENT OFFICE 2,476,849

DISCRIMINATOR CIRCUIT

William K. Ergen, Oak Ridge, Tenn., assignor to Minneapolis-Honeywell Regulator Company, Minneapolis, Minn., a corporation of Delaware Continuation of application Serial No. 500,475, August 30, 1943. This application December 13, 1947, Serial No. 791,627

26 Claims. (Cl. 318—300)

This application is a continuation of my former application, Serial Number 500,475, filed August 30, 1943 now abandoned.

This invention relates generally to electronic circuits and more specifically to a circuit and method of control wherein the operation of a tetrode electronic amplifier tube is controlled by the impression of alternating current signal voltages of different phase relations upon the shield, or screen grid, and control grid of the tube, which signal voltages are of the same frequency, and of a frequency different than that of an alternating anode voltage applied to the tube.

The primary object of the invention is to provide a circuit and a method adapted for the operation or control of an alternating current motor or instrument, on response to the change in phase of an alternating input signal voltage, and in such manner that the frequency of the alternating voltage actuating the motor, or otherwise doing work under control of the circuit, may be of a low order, such as 15 cycles up to a few hundred cycles or the like, whereas the controlling alternating signal voltages may be of a higher, or different, frequency, which may be better adapted to the impedance characteristics of the control unit.

My invention may find one useful application, and is herein disclosed as applied to a discriminator circuit, wherein a reversible split phase motor is controlled to run in opposite directions according to the phase relation of the input signals applied to the grids of multi-grid discriminator amplifier tubes, the anodes of which are supplied with an alternating voltage of the same frequency as that of the voltage supplied to one of the field windings of the motor. The other field winding of the motor is then excited by the anode currents flowing through one or the other of the tubes, the phase relation of this exciting voltage, relative to that continuously supplied to the first mentioned field winding, depending upon the phase relation of the input signals impressed on the control grids of the tubes.

Heretofore, to my knowledge, the frequency of the input signal voltage at the control grids of the discriminator tubes has been the same as the frequency of the anode voltage on the tubes and this anode voltage is most conveniently and conventionally of a low order, corresponding to the frequency of the usual line or inverter supply. In many cases, the input signal voltage must ordinarily be derived from, or at least controlled by, some form of variable impedance element. Particularly where it is desired to employ capacitive elements as controlling impedances, it is desirable to employ higher frequencies than are employed in the discriminator plate circuit.

Having in mind these facts, it is evident that my circuit, permitting control of the discriminator tubes by input signals of frequencies different from the frequency of the anode voltage on the tubes, will make possible the use of input or controlling signals of comparatively high frequencies which will be of such order as to greatly increase the sensitivity of circuits employing capacitive impedances as controlling elements.

Another and important object of my invention is to provide an electronic circuit embodying a discriminator circuit employing gas filled multi-grid tubes or tetrodes, an oscillator, and a pickup or variable impedance bridge, wherein the oscillator supplies both an actuating current to the bridge and a standard voltage of the same frequency. The standard voltage is applied to corresponding grids of the two discriminator tubes so that the voltage on one is 180° out of phase with that on the other. The voltage induced by a condition of unbalance in the bridge is then impressed on two other corresponding grids of the tubes in such manner that this voltage is of the same phase on both these grids but may be varied simultaneously on both grids by one hundred and eighty electrical degrees under control of the bridge.

The effect is to cause ionization, or ignition of the gas to take place in the discriminator tube in which the standard voltage is in phase with the bridge voltage. Thus one or the other tube will draw current in its anode circuit according to the phase angle of the bridge voltage. Although the exciting voltages are, as stated, of a different, and usually higher, frequency than the frequency of the anode voltages on the tubes, these gas filled tubes will have the property of continuing to operate and draw current during the entire half cycle in which their anodes are positive with respect to their cathodes, and regardless of the number of phase reversals taking place in the grid voltages.

With these and other objects in view, the invention resides in the novel circuit arrangements and methods of control hereinafter fully set forth and claimed, reference being had to the accompanying drawing wherein:

Figure 1:
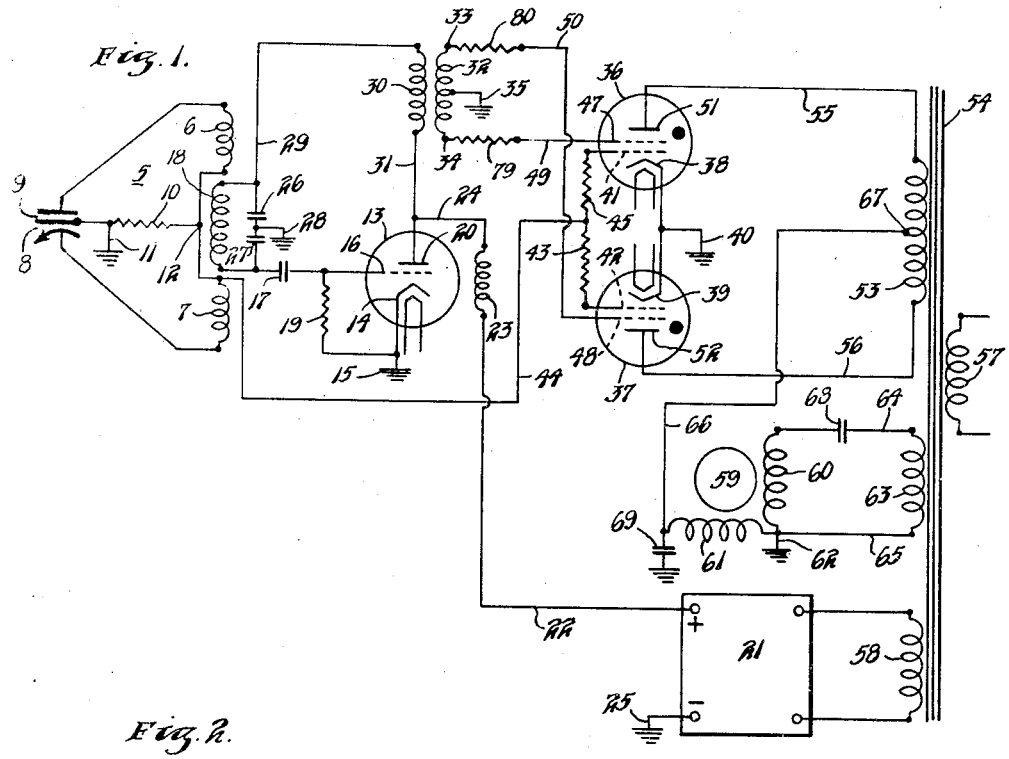
Fig. 1 is a diagrammatic showing of a circuit embodying my invention.

Referring now more particularly to Fig. 1 of the drawing, I have shown my invention as embodied in a circuit which includes a variable impedance bridge 5, one arm of which includes an inductance coil 6, another arm, a similar inductance coil 7, another arm, a condenser 8 and the fourth arm the condenser 9. One condenser, such as condenser 9, may be fixed and the other varied in accordance with any controlling condition. The junction of the coils 6 and 7 is grounded through a resistor 10 while the common plate of the two condensers 8 and 9 is at ground potential, as represented at 11. When the impedance bridge is balanced, it is obvious that the coil junction constituting the detector point 12 of the bridge will remain at zero, with respect to ground but when the bridge is unbalanced this point will be at an alternating potential with respect to ground the phase of this potential being dependent upon the side of the bridge at which the unbalance occurs. The resulting voltage across resistor 10 is employed as a control signal, as will be more apparent later.

The bridge 5 is powered by an oscillator which includes, as here shown, a triode 13 the cathode 14 of which is grounded at 15 and the control grid 16 of which is connected through a blocking condenser 17 to one end of an inductance coil 18 which is inductively coupled, as indicated, to the coils 6 and 7. A resistor 19 is connected from control grid 16 to ground and completes the grid to cathode circuit. The other end of the coil 18 is connected ultimately to the anode 20 of the triode. A direct current supply indicated by block diagram at 21 is connected through conductor 22, a high frequency choke coil 23, and conductor 24 to the oscillator. The negative pole of the output of power supply 21 is grounded as represented at 25 and is thus connected through ground to the cathode 14. The coil 18 is tuned by a pair of condensers 26—27 connected across its terminals and with their junctions grounded as represented at 28.

The oscillator circuit arrangement is such that an alternating potential is generated in the coil 18, the frequency of which is dependent on the constants of the various tank circuit elements involved in usual fashion, and this potential is inductively coupled by interaction between the respective coils 6, 7, and 18 to the impedance bridge to induce an alternating current flow around the bridge. The coil 18 and condensers 26—27 constitute a tank circuit for the oscillator.

In accordance with my invention, the connection between the coil 18 and anode 20 of the triode 13 includes a conductor 29, another inductance coil 30 and a conductor 31 so that the coil 30 is in series with the above named tank circuit and an alternating potential is therefore also generated in this coil. Another inductance coil 32 is inductively coupled to coil 30 and its terminals form supply or output points 33 and 34 from which may be derived alternating current potentials which are of opposite phase, due to a ground 35 provided at the center of the coil 32. It is thus seen that the oscillator and bridge circuit provides three points 12, 33 and 34 from which alternating potentials of the same frequency, but varying phase relationships, may be taken off.

My circuit further includes a discriminator stage embodying two tetrodes or multi-grid electronic tubes 36 and 37 of the gas filled type. The cathodes 38—39 of these tubes are grounded as designated at 40 while the control grids 41—42 are electrically connected by protective resistors 43 and 45, from the junction of which a conductor 44 leads to the detector point 12 of the bridge 5 for excitation of the tubes in response to unbalance of the bridge, as indicated by the voltage drop across resistor 10. The shield or screen grids 47—48 of the discriminator tubes are connected by protective resistors 79 and 80 and by conductors 49—50 to the points 34—33 respectively.

The anodes 51 and 52 of the tubes 36 and 37 are supplied with alternating current potentials from a secondary winding 53 of a transformer 54, or other suitable source of supply, the anodes being connected by conductors 55 and 56 to the ends of this winding. The transformer includes also a primary winding 57 and a secondary winding 58 for supplying power to the rectifier and filter (not shown) making up the direct current supply 21 for the oscillator.

As herein shown, the discriminator actuates a split phase, reversible induction motor having a rotor 59 and two field windings 60 and 61 which have a common, grounded terminal 62. One field winding 60 of this motor is continuously excited from a secondary winding 63 on the transformer 54 across which the field is connected by means of conductors 64 and 65. The other field winding 61 is excited by the amplifier through a conductor 66 by which the ungrounded end of this winding is connected to the center tap 67 of the anode supply winding 53 of the transformer. Obviously, when either tube 36 or 37 is excited and draws current a voltage will be developed and impressed across the field winding 61 of the motor, this voltage being of the same frequency as that in the field winding 60 and being either in phase, or one hundred and eighty electrical degrees out of phase, with the voltage supplied by transformer winding 63. When neither tube is thus operated the current flowing in the amplifier excited field winding 61 will be negligible and no motor rotation will occur. A condenser 68 is placed in the conductor 64 supplying the field winding 60 and the capacity of this condenser is so chosen as to cause a phase displacement of the voltage across field winding 60 through an angle of approximately ninety electrical degrees with respect to the voltage across secondary 63. It is evident, therefore, that the current in field winding 60 will either lead, or lag, the current in winding 61 by this phase angle, and motor rotation will thus take place when the discriminator tubes are properly excited. The direction of such rotation will depend upon whether the current in the continuously excited field leads or lags the current in the amplifier excited field winding and the reversal of phase possible in the latter will of course determine this direction of rotation. This phase reversal is a function of the phase of the bridge voltage, thus placing the direction of motor rotation directly under control of the bridge voltage.

A condenser 69 is provided between ground and the end of field winding 61 so as to be in parallel with field winding 61. This condenser tends to improve the wave form of the current supplied to winding 61 by the conducting tube of the discriminator stage by by-passing higher frequencies.

Considering now the operation of the circuit as a whole, it will first be evident that, while the oscillator supplies current to the bridge 5, so long as this bridge is in balance the detector point 12 will remain substantially at zero potential to ground, and no excitation or signal voltage will be applied to the control grids 41—42 of the tubes 36—37. However, the shield or screen grids 47—48 of the tubes will have impressed on them at all times an alternating current potential from the oscillator winding 30 and coupling winding 32 which potential, at either of said grids, is out of phase with the potential on the other, due to the center tapped coupling coil employed in feeding them. Now should the bridge 5 become unbalanced the point 12 will go alternately positive and negative, causing the application of an alternating signal voltage to control grids 41—42. This voltage will be in phase with the voltage on one of the shield grids 47 and 48 and out of phase with the other, the phase angle of the signal voltage depending upon the conditions causing the bridge unbalance as will be understood.

It is a well known property of a tube of the tetrode or multi-grid variety that the shield or screen grid potential controls to a large extent the operating point of the tube, or has an effect upon the amount of excitation required to cause the tube to draw anode current. In other words for grid voltages of certain magnitudes, the voltages in the shield and control grids must be in phase or augment each other, in order to permit the tube to draw current. Such being the case, it is evident that in my circuit only one of the tubes 36—37 will be operated, that tube being the one in which the bridge voltage is in phase with the voltage applied to the shield or screen grid, and inasmuch as the shield grid voltages are of opposite phase only one tube at a time will be caused to operate. However, since the signal voltage supplied the control grids 41—42 may vary by a phase angle of 180 electrical degrees, it is equally obvious that either of the discriminator tubes 36—37 may be operated, directly under control of balance conditions in the bridge. While either tube is operating and drawing current the other will of course remain inoperative, since its shield grid voltage is out of phase with the bridge voltage.

The motor will then be controlled directly by conditions in the bridge circuit since the phase of the current in its amplifier excited field winding 61 will be varied by 180 electrical degrees according to which of the discriminator tubes is in operation as previously described. I do not, however, intend to limit myself to the control of a motor by my circuit, and it will be apparent that the controlled phase alternating current provided by the discriminator may be employed for other work, such as actuating relays, controlling alternating current instruments, and the like.

An important feature of my present invention resides in the latitude it provides for selection of the operating frequencies of the various voltages involved. It is, of course, usually most feasible to support the motor and the anodes of the discriminator tubes from an available source of power, such as a transformer, as here shown. The nature of such a source of power usually is such that the frequency of the voltages provided are of a comparatively low order. On the other hand optimum operation of the variable impedance bridge here shown as the ultimate controlling factor, is greatly facilitated by the use of operating and exciting voltages at these points which are of a considerably higher frequency than that of the motor. For this reason I prefer to employ gas filled thyratrons at 36—37 and in such case it is found that, even with the frequency of the voltages on the control grids 41—42 and shield grids 47—48 considerably higher than that of the motor and the voltage provided by the transformer 54, the hereinbefore described operation will take place. This is for the reason that, once the exciting voltages have caused ionization to take place in the thyratron, it will continue to draw current during the complete half cycle of the lower frequency during which its anode is positive and regardless of the number of times the grid voltages may alternate from positive to negative.

Figure 2:
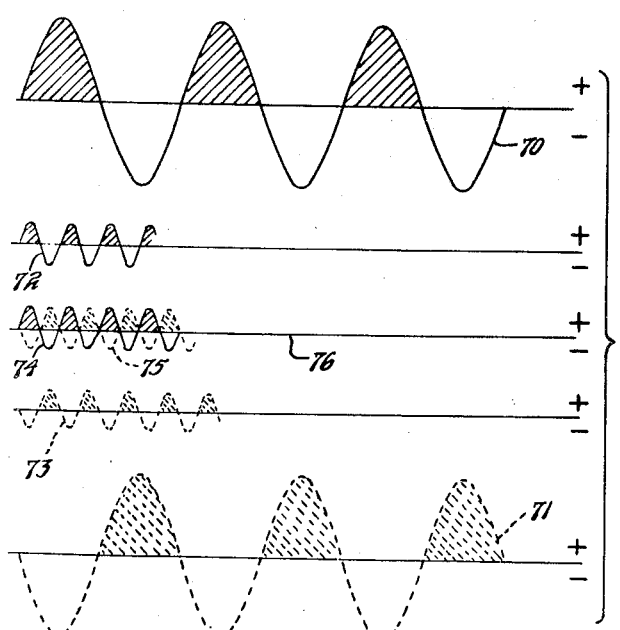
Fig. 2 is a view showing voltage waves or curves illustrating the operation of the discriminator stage of the circuit.

Referring to Fig. 2, this operation is clarified by the curves there shown. The voltage wave or curve 70 represents the instantaneous anode potential to ground of the upper discriminator tube 36, while the similar, but oppositely phased, voltage wave 71 represents the similar condition in lower tube 37. The voltage waves 72—73 show the oppositely phased alternating current potentials to ground of the upper tube shield grid 47 and lower tube shield grid 48, respectively. The composite voltage waves 74—75, drawn about a common axis 76, represent the possible potentials on both control grids 41 and 42, the solid line wave 74 showing the potential on the control grids when they are in phase with the shield grids of the upper tube 36, and the dotted line wave 75 showing the control grid potential wave when it is in phase with the shield grid of the lower tube 37. All curves are indicated, for convenience sake, as pure sine wave forms.

It will be seen that as the waves 72 and 74 swing positive or above their axes, the anode current wave 70 rises and the upper tube 36 is then in operation and drawing current. The frequency of the control grid and shield grid potentials being higher than that of the anode potential, the waves 72 and 74 will then swing negative and pass through several complete cycles while the anode current wave 70 is completing its positive half cycle, but the anode will continue to draw current throughout this time, since the ionization of the gas in the tube will maintain the flow of electrons. As the anode current wave 70 returns to zero and swings negative the tube will, of course, be rendered inoperative until the next positive half cycle.

With the control grid potential out of phase with the potential, shown by wave 73, on the shield grid of the lower tube 37, excitation of the tube will not occur as has been pointed out hereinbefore. However, when the phase of the control grid potential is reversed it will, as shown by voltage wave 75, be properly in phase with the shield grid potential represented by voltage wave 73, causing the lower tube 37 to draw current through its positive half cycle as indicated. The corresponding positive half cycles during which the anode voltages in the respective tubes are properly phased for the described operation are indicated by the shading in Fig. 2.

The use of gas filled thyratrons in the discriminator stage is not, however, strictly necessary, and conventional evacuated multi-grid tubes or tetrodes may be used even with the frequency of the two or more grids higher than that of the motor and anode potential. In this case a pure wave form will not be obtained but the current reversals in the anode circuit will be in the form of half waves occurring at the frequency of the grid voltage during the whole positive half cycle at the anode frequency. For at least some work the output currents then obtained will be satisfactory.

In its broadest aspects my invention is seen to comprise a method for controlling, and means for operating, a tetrode or multi-grid tube by the application to two or more of its grids of alternating voltages of one frequency and supplying to the anode an alternating voltage of a different frequency. By then controlling the phase angle between the grid voltages the tube is caused to draw current through positive half cycles at the frequency of the anode voltage.

Having now fully disclosed my invention what I claim as new and desire to secure by Letters Patent is:

1. The method of controlling a discriminator circuit embodying two electronic tubes each of which has an anode and first and second separate grids, and wherein a first grid of each tube is connected electrically to a corresponding first grid of the other tube, which comprises impressing alternating current voltages of opposite time phase on the two anodes, impressing alternating current voltages on said second grids of the tubes, which voltages are of opposite phase angle and of the same frequency but of a frequency different than that of the anode voltages, impressing an alternating current voltage of the same phase on the connected grids of the tubes and which voltage is of the same frequency as the other grid voltages, and varying the phase angle of the voltages on said electrically connected grids by one hundred and eighty electrical degrees.

2. A system for operating a discriminator amplifier wherein two multi-grid electronic tubes are employed, each having an anode, a control grid and a shield grid, which comprises means for supplying the anodes of the tubes with alternating current voltages which vary in phase angle by one hundred and eighty electrical degrees at the respective anodes, means for supplying separate alternating current voltages of opposite phase relationship to the shield grids of the tubes and which voltages are of frequencies different than that of the anode voltages, means for supplying the control grids with alternating current voltages of the same frequency as that of the shield grid voltages, and means for varying the phase angle of the voltages in the control grids simultaneously by one hundred and eighty electrical degrees with respect to the voltages on the shield grids.

3. A system for controlling the operation of an electronic amplifier having two gas filled multi-grid electronic tubes with anodes, shield grids and control grids and wherein the anodes are connected in out of phase relation to an alternating current voltage supply, which comprises means supplying to the shield grids separate alternating current voltages of opposite phase relationship and of the same frequency but of a frequency different than that of the anode voltage on each tube, means supplying to the control grids another alternating current voltage of a frequency identical to that of the voltage on the shield grids, and means for varying the phase angle of the control grid voltage on both tubes simultaneously to bring this voltage into, or out of, phase with the voltage on the respective shield grids.

4. An electronic circuit arrangement of the character described comprising in combination, a gas filled multi-grid tube having a shield grid, a control grid and an anode, means for supplying an alternating current potential to the anode, means for supplying an alternating current potential to the shield grid of a frequency higher than the frequency of the anode potential, means for supplying another alternating current potential to the control grid, the said control grid potential being of the same frequency as the shield grid potential, and means for varying the phase relation between said grid potentials by phase angle of one hundred and eighty electrical degrees.

5. An electrical circuit arrangement of the character described comprising in combination, a gas filled tetrode having an anode, a shield grid and a control grid, means for supplying an alternating voltage to the anode, means for supplying to the shield and control grids separate alternating voltages of the same frequency and of a frequency higher than that of the anode voltage, and means for varying the phase angle of one of said grid voltages relative to the other by one hundred and eighty electrical degrees whereby ionization will occur in the tetrode when the grid voltages are in phase and the anode will draw current through its complete positive voltage swing regardless of the greater rapidity of voltage reversals taking place at the grids.

6. A circuit arrangement of the character described comprising in combination, a pair of electronic tubes each having an anode, a shield grid and a control grid, means for supplying the anodes with alternating potentials of opposite phase relation, means for supplying the shield grids with separate alternating potentials of the same frequency but of opposite phase relation, means for supplying the control grids with an alternating potential which is of the same phase relation on each of said grids, the potentials on the respective grids all being of the same frequency and of a frequency which is different than that of the anode potential, and means for varying the phase angle of the control grid potential with respect to the shield grid potential by approximately one hundred and eighty electrical degrees so that it will augment the shield grid potential on one shield grid while opposing the potential on the other shield grid.

7. An electrical circuit arrangement of the character described comprising in combination, a pair of tetrodes each having an anode, a shield grid and a control grid, means for supplying the anodes with alternating voltages of opposite phase relation, means for supplying the shield grids with alternating voltages also of opposite phase relation, means for supplying the control grids with alternating voltages of the same phase relation, the voltages on the respective grids being of the same frequency and a frequency higher than that of the anode voltage, and means for varying the phase of the control grids voltage with respect to the voltages on the shield grids by one hundred and eighty electrical degrees.

8. An electrical circuit arrangement comprising in combination, a pair of electronic tubes each having an anode and two separate grids, means for supplying alternating current voltages to the anodes, means for supplying alternating current voltages of opposite phase relationship to two corresponding grids of the tubes, means for supplying alternating current voltages of the same phase relationship to the other two corresponding grids of the tubes, means for simultaneously altering the phase angle of the voltage on the latter pair of grids with respect to the voltages on the other grids, the respective grid voltages all being of the same frequency and of a frequency different from that of the anode voltage.

9. An electrical circuit arrangement of the character described, comprising in combination, a pair of electronic tubes each having an anode, a shield grid, and a control grid, means for supplying an alternating potential to the anodes, an oscillator operatively arranged to supply alternating signal voltages of a frequency different than the frequency of the said anode potential, means connecting the oscillator and the shield grids of the tubes for supplying alternating potentials of opposite phase angle to these grids, other means energized by said oscillator and connected to the control grids of the tubes for supplying signal voltages of the same phase relationship to both of said grids, and means for varying the phase angle of the signal voltage on both control grids simultaneously by one hundred and eighty electrical degrees.

10. An electrical circuit arrangement of the character described, comprising in combination, a pair of electronic tubes each having an anode, a shield grid, and a control grid, means for supplying an alternating potential to the anodes, an oscillator circuit including an electronic tube and two separate circuits to which the tube supplies alternating potentials of an identical frequency but a frequency different than that of the anode voltage on the said pair of tubes, one of said separate circuits being connected to the shield grids to supply alternating potentials of opposite phase angle to the respective grids, the other separate circuit being connected to the control grids to supply alternating potentials of the same phase angle to these grids, and means for varying the phase relationship of the potential on the control grids by one hundred and eighty electrical degrees with respect to the potentials on the shield grids.

11. An electrical circuit arrangement of the character described, comprising in combination, a variable impedance bridge, an oscillator coupled to said bridge to cause alternating current to flow around the bridge, said bridge having a detector point remaining at a constant potential when the bridge is balanced but which varies in potential by a phase angle of one hundred and eighty electrical degrees when the bridge is unbalanced, the said oscillator also having separate means for continuously supplying alternating current potentials of opposite phase angle to each other and of the same frequency as the current in the bridge, a pair of electronic tubes each having an anode, a shield grid and a control grid, means for supplying an alternating potential to the said anodes of a frequency lower than the frequency generated by the oscillator, the said control grids being connected to the detector point of the bridge, and the shield grids being respectively connected to the said separate supply means of the oscillator to receive alternating potentials therefrom of opposite phase angle.

12. An electrical circuit arrangement of the character described, comprising in combination, a variable impedance bridge, an oscillator coupled to said bridge to cause alternating currents to flow around the bridge, said bridge having a detector point remaining at a constant potential when the bridge is balanced but which varies in potential by a phase angle of one hundred and eighty electrical degrees when the bridge is unbalanced, the said oscillator also having two separate output points supplying alternating potentials of opposite phase angle and of the same frequency as the current in the bridge, a pair of electronic tubes each having an anode and two separate grids, means for supplying an alternating current potential to the said anodes of a frequency different than that of the oscillator, one corresponding grid of each tetrode tube being electrically connected to the other and to the said detector point of the bridge, and the remaining grid of each tube being separately connected to one of the said output points of the oscillator.

13. In apparatus for controlling the energization of a device adapted to be energized by low frequency current in accordance with a high frequency signal voltage, an electronic tube having an anode and two control elements, means for applying an alternating voltage of said low frequency to said anode, means for applying to one of said control elements a first alternating voltage of said high frequency, and means for applying to said other control element a second alternating signal voltage of said high frequency but of reversible phase with respect to said first alternating voltage so that said tube is conductive only when said first and second alternating voltages have a predetermined phase relationship.

14. In apparatus for controlling the energization of a device adapted to be energized by low frequency current in accordance with a high frequency signal voltage, an electronic tube having an anode and two control elements, means for applying an alternating voltage of said low frequency to said anode, means for applying to one of said control elements a first alternating voltage of said high frequency, means for applying to said other control element a second alternating signal voltage of said high frequency so that said tube is conductive only when said first and second alternating voltages have a predetermined phase relationship, and means for varying the phase of said second voltage with respect to said first voltage by an angle of one hundred and eighty electrical degrees.

15. In apparatus for controlling the energization of a device adapted to be energized by low frequency current in accordance with a high frequency signal voltage, a gas filled electronic tube having an anode, a control grid, and a shield grid, means for applying an alternating voltage of said low frequency to said anode, means for applying to one of said grids a first alternating voltage of said high frequency, means for applying to said other grid a second alternating signal voltage of said high frequency, and means for altering the phase relation between said second alternating voltage and said first alternating voltage so that said tube is conductive only when said first and second alternating voltages have a predetermined phase relationship.

16. A device of the class described comprising, in combination: an electron discharge device having a cathode, an anode, and control means; a source of high frequency voltage; an impedance network; means energizing said network from said source; impedance means in said network which may be varied to cause a change in the high frequency output voltage from said network; a source of low frequency voltage; means applying said low frequency voltage to said anode; means applying said output voltage and said voltage from said high frequency source to said control means, so as to influence the discharge of said device; a load device designed for operation when energized with voltage having an alternating component of said low frequency; and means energizing said load device during discharge of said discharge device.

17. A device of the class described comprising, in combination: a source of high frequency voltage; a balanceable network; means energizing said network from said source; means for affecting the balance of said network to vary the high frequency output voltage thereof; a pair of electron discharge devices each having an anode, a cathode, and means controlling the discharge thereof; independent anode circuits for said devices; a source of low frequency voltage; means applying voltages from said sources and said network to electrodes of said devices to influence the discharge thereof, to affect the flow of currents in said anode circuits; a load device designed for reversible operation when energized with voltages having an alternating component of said low frequency; and means energizing said load device from said low frequency source in accordance with the relation between said anode currents.

18. A device of the class described comprising, in combination: a source of high frequency voltage; a balanceable network; means energizing said network from said source; means for affecting the balance of said network to vary the high frequency output voltage thereof; a pair of electron discharge devices each having an anode, a cathode, and means for controlling the discharge thereof; independent anode circuits for said devices; a source of low frequency voltage; means applying voltages from said sources and said network to electrodes of said devices to influence the discharges thereof, to affect the flow of currents in said anode circuits, in such a manner that one of said voltages has the same effect on both said anode currents, while each of the other voltages has opposite effect on said anode currents; a load device designed for operation when energized with voltage having an alternating component of said low frequency; and means energizing said load device from said low frequency source in accordance with the relation between said anode currents.

19. A device of the class described comprising, in combination: a source of high frequency voltage; a balanceable network; means energizing said network from said source; means for affecting the balance of said network to vary the high frequency output voltage thereof; a source of low frequency voltage; a pair of rectifiers; circuits for said rectifiers; means making voltages from said sources and said network effective in said circuits to cause the flow of current therein, in such a fashion that one of said voltages has the same effect on the currents in both said circuits, while each of the other voltages has opposite effect on said currents; a load device designed for operation when energized with voltage having an alternating component of said low frequency; and means energizing said load device from said low frequency source in accordance with the relation between said currents.

20. A device of the class described comprising, in combination: a source of high frequency voltage; a balanceable network; means energizing said network from said source; means for affecting the balance of said network to vary the high frequency output voltage thereof; a source of low frequency voltage; a pair of rectifiers; circuits for said rectifiers; means inductively and conductively making voltages from said sources and said network effective in said circuits to cause the flow of currents therein, in such a fashion that one of said voltages has the same effect on the currents in both said circuits, while each of the other voltages has opposite effects on said currents; a load device designed for operation when energized with voltage having a component of said low frequency; and means energizing said load device from said low frequency source in accordance with the relation between said currents.

21. A device of the class described comprising, in combination: a source of high frequency voltage; a balanceable network; means energizing said network from said source; means for affecting the balance of said network to vary the high frequency output voltage thereof; a pair of electron discharge devices each having an anode, a cathode, and means controlling the discharge thereof; independent anode circuits for said devices; a source of low frequency voltage; means applying voltages from said sources and said network to electrodes of said devices to influence the discharge thereof, whereby to affect the flow of current in said anode circuit; a load device designed for reversible operation when energized with voltage having an alternating component of said low frequency; and means energizing said load device from said low frequency source in accordance with the relation between said anode currents.

22. A device of the class described comprising, in combination: an electron discharge device having a cathode, an anode, and discharge control means; a first source of alternating voltage of a selected high frequency; a second source of alternating voltage of said selected high frequency, whose amplitude may vary and whose phase angle with respect to said first voltage may be substantially zero degrees or 180°; means energizing said discharge control means with voltages from both said high frequency sources; a source of alternating voltage of a selected low frequency; an anode circuit for said discharge device energized by said source of low frequency voltage; a load device designed for operation when energized with voltage having an alternating component of said low frequency; and means energizing said load device from said low frequency source during discharge of said discharge device.

23. A device of the class described comprising, in combination: an electron discharge device having a cathode, an anode, and discharge control means; a source of alternating voltage of a selected high frequency; an impedance network; means energizing said network from said source; impedance means in said network which may be varied to cause a change in the high frequency output from said network, so that its amplitude may vary and its phase angle with respect to the voltage of said source may be substantially zero degrees or 180°; means energizing said discharge control means with voltages from said bridge and said source; a source of alternating voltage of a selected low frequency; an anode circuit for said discharge device energized by said source of low frequency voltage; a load device designed for operation when energized with alternating voltage having an alternating component of said low frequency; and means energizing said load device from said low frequency source during discharge of said discharge device.

24. An electrical circuit arrangement of the character described comprising, in combination, an electron discharge device having a cathode, an anode, and discharge control means, a first source of high frequency voltage, a second source of high frequency voltage of the same frequency of said first source and varying in amplitude and phase angle with respect to said first source, a source of low frequency voltage, means applying said low frequency voltage to said anode, means applying said high frequency voltages to said control means, so as to influence the discharge of current in said discharge device, by means actuated by the current comprising said discharge.

25. An electrical circuit arrangement of the character described comprising, in combination, an electron discharge device having a cathode, an anode, and discharge control means, a source of high frequency voltage, an impedance network, means energizing said network from said source, impedance means in said network which may be varied to cause a change in the high frequency output voltage from said network, a source of low frequency voltage, means applying said low frequency voltage to said anode, and means applying said output voltage and said voltage from said high frequency source to said control means, so as to influence the discharge of said device.

26. In a device of the class described in combination: an electron discharge device having a cathode, an anode, and discharge control means; a first source of alternating voltage of a selected high frequency; a second source of alternating voltage of said selected high frequency, whose amplitude may vary and whose phase angle with respect to said first voltage may be substantially zero degrees or 180°; means energizing said discharge control means with voltages from both said high frequency sources; a source of alternating voltage of a selected low frequency; an anode circuit for said discharge device energized by said source of low frequency voltage; a low frequency motor; and means energizing said motor in accordance with said discharge.

WILLIAM K. ERGEN.

REFERENCES CITED

The following references are of record in the file of this patent:

UNITED STATES PATENTS

| Number | Name | Date |
| --- | --- | --- |
| 2,137,126 | Bedford | Nov. 15, 1938 |
| 2,412,163 | Lundberg | Dec. 3, 1946 |
| 2,426,711 | Shaffer | Sept. 2, 1947 |

Certificate of Correction

Patent No. 2,476,849 — July 19, 1949

WILLIAM K. ERGEN

It is hereby certified that error appears in the printed specification of the above numbered patent requiring correction as follows:

Column 5, line 60, for the word "support" read *supply*; and that the said Letters Patent should be read with this correction therein that the same may conform to the record of the case in the Patent Office.

Signed and sealed this 4th day of April, A. D. 1950.

[SEAL]

THOMAS F. MURPHY,
*Assistant Commissioner of Patents.*